United States Patent
Ohba

(10) Patent No.: US 11,955,094 B2
(45) Date of Patent: Apr. 9, 2024

(54) HEAD-MOUNTED DISPLAY AND IMAGE DISPLAYING METHOD

(71) Applicant: SONY INTERACTIVE ENTERTAINMENT INC., Tokyo (JP)

(72) Inventor: Akio Ohba, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/427,036

(22) PCT Filed: Feb. 1, 2019

(86) PCT No.: PCT/JP2019/003738
§ 371 (c)(1),
(2) Date: Jul. 29, 2021

(87) PCT Pub. No.: WO2020/157979
PCT Pub. Date: Aug. 6, 2020

(65) Prior Publication Data
US 2022/0101803 A1 Mar. 31, 2022

(51) Int. Cl.
*G09G 3/34* (2006.01)

(52) U.S. Cl.
CPC ..... *G09G 3/3406* (2013.01); *G09G 2320/062* (2013.01); *G09G 2320/0626* (2013.01); *G09G 2320/10* (2013.01)

(58) Field of Classification Search
CPC ........... G09G 3/3406; G09G 2320/062; G09G 2320/0626; G09G 2320/10; G09G 2320/0276
See application file for complete search history.

(56) References Cited

U.S. PATENT DOCUMENTS

| 7,023,496 B2 * | 4/2006 | Nagata | G09G 3/3611 348/E9.037 |
| 7,043,093 B2 * | 5/2006 | Asano | H04N 5/20 348/E5.073 |
| 7,477,228 B2 * | 1/2009 | Wyatt | G09G 3/3406 345/99 |
| 8,269,692 B2 * | 9/2012 | Sugiyama | G02B 27/017 345/9 |

(Continued)

FOREIGN PATENT DOCUMENTS

| JP | 2009-122367 A | 6/2009 |
| JP | 2009122367 A * | 6/2009 |

(Continued)

OTHER PUBLICATIONS

International Search Report and Written Opinion dated Apr. 9, 2019, from PCT/JP2019/003738, 9 sheets.

(Continued)

*Primary Examiner* — Michael J Jansen, II
(74) *Attorney, Agent, or Firm* — XSENSUS LLP

(57) ABSTRACT

In a head-mounted display 100, an input information acquisition unit 140 receives selection of content by a user. A frame rate information acquisition unit 144 acquires information relating to a frame rate of the content, and a luminance adjustment unit 146 determines display luminance according to the frame rate. A content reproduction unit 142 reproduces an image of the content, and a display unit 150 displays the image at the determined luminance.

19 Claims, 6 Drawing Sheets

(56) References Cited

U.S. PATENT DOCUMENTS

| | | | |
|---|---|---|---|
| 8,547,316 B2* | 10/2013 | Doi | G09G 3/3688 345/55 |
| 8,643,581 B2* | 2/2014 | Kikuta | G09G 3/007 345/98 |
| 8,730,271 B2* | 5/2014 | Kim | G09G 3/3225 345/212 |
| 8,934,054 B2* | 1/2015 | Ohno | H04N 7/0132 348/451 |
| 9,236,018 B2* | 1/2016 | Nakanishi | G09G 3/3677 |
| 9,262,987 B2* | 2/2016 | Albrecht | G09G 5/006 |
| 9,313,396 B2* | 4/2016 | Koishi | G03B 13/36 |
| 9,514,675 B2* | 12/2016 | Kim | G09G 3/3225 |
| 9,847,056 B2* | 12/2017 | Shimizu | G09G 3/3233 |
| 9,865,231 B2* | 1/2018 | Kim | G09G 5/36 |
| 9,892,708 B2* | 2/2018 | Yano | G09G 5/00 |
| 10,373,545 B2* | 8/2019 | Kim | G06F 1/32 |
| 10,701,307 B2* | 6/2020 | Kato | H04N 7/0127 |
| 10,757,337 B2* | 8/2020 | Nomura | H04N 23/73 |
| 10,769,438 B2* | 9/2020 | Bendale | G06V 10/235 |
| 11,475,845 B2* | 10/2022 | Kim | G09G 3/3233 |
| 2003/0067546 A1* | 4/2003 | Asano | G09G 5/00 348/241 |
| 2003/0076886 A1* | 4/2003 | Nagata | G09G 3/3611 348/E9.037 |
| 2005/0134547 A1* | 6/2005 | Wyatt | G09G 3/3406 345/102 |
| 2009/0058763 A1* | 3/2009 | Doi | G09G 3/3688 345/55 |
| 2010/0103077 A1* | 4/2010 | Sugiyama | G02B 27/0172 340/425.5 |
| 2010/0164937 A1* | 7/2010 | Kim | G09G 3/3225 345/212 |
| 2011/0216240 A1* | 9/2011 | Ohno | H04N 7/01 348/E7.003 |
| 2011/0227961 A1* | 9/2011 | Kikuta | G09G 3/3225 345/690 |
| 2012/0044252 A1* | 2/2012 | Kamimura | G09G 5/006 345/530 |
| 2013/0335386 A1* | 12/2013 | Yano | G09G 5/02 345/204 |
| 2014/0225877 A1* | 8/2014 | Nakanishi | G09G 3/3677 345/204 |
| 2014/0247294 A1* | 9/2014 | Kim | G09G 3/3225 345/77 |
| 2014/0267370 A1* | 9/2014 | Albrecht | G09G 5/006 345/602 |
| 2015/0022712 A1* | 1/2015 | Koishi | H04N 5/2351 348/352 |
| 2015/0130823 A1* | 5/2015 | Kim | G09G 5/18 345/82 |
| 2016/0093248 A1* | 3/2016 | Shimizu | G09G 3/3225 345/691 |
| 2016/0343288 A1* | 11/2016 | Kim | G09G 3/2018 |
| 2018/0007311 A1* | 1/2018 | Kato | H04N 7/0127 |
| 2018/0341811 A1 | 11/2018 | Bendale et al. | |
| 2019/0158717 A1* | 5/2019 | Nomura | G02B 27/0093 |
| 2022/0101794 A1* | 3/2022 | Kim | G09G 3/3266 |

FOREIGN PATENT DOCUMENTS

| | | |
|---|---|---|
| JP | 2011-242711 A | 12/2011 |
| JP | 2015-94954 A | 5/2015 |
| JP | 2017-211431 A | 11/2017 |
| WO | 2007060783 A1 | 5/2007 |
| WO | 2009/066465 A1 | 5/2009 |
| WO | 2016/194232 A1 | 12/2016 |

OTHER PUBLICATIONS

"Chapter 16: Human eye sensitivity and photometric quantities," pp. 275-291, [online], [searched on Jan. 31, 2019], internet <see URL: https://www.ecse.rpi.edu/~schubert/Light-Emitting-Diodes-dot-org/Sample-Chapter.pdf>).

Satoru Kawamura and Shuji Tachibanaki, "Rod and cone photoreceptors: molecular bases of the difference in their physiology", Comp Biochem Physiol A Mol Integr Physiol. Aug. 2008; 150(4):369-77, DOI: 10.1016/j.cbpa.2008;04.600.

International Preliminary Report on Patentability dated Aug. 12, 2021, from PCT/JP2019/003738, 12 sheets.

Decision of Refusal drafted Nov. 4, 2022, from Japanese Application No. 2020-569329, 3 sheets.

* cited by examiner

| FRAME RATE | DISPLAY LUMINANCE |
|---|---|
| 1-30 (fps) | 50 (%) |
| 31-240 (fps) | 100 (%) |

160

(a)

(b)

HEAD-MOUNTED DISPLAY AND IMAGE DISPLAYING METHOD

TECHNICAL FIELD

The present invention relates to a head-mounted display which displays an image of content and an image displaying method thereof.

BACKGROUND ART

Enhancement of an image processing technique or a network has made it possible for a user to enjoy various pieces of content involving image display, irrespective of a place or a scale in display. For example, according to a head-mounted display worn on the head of a user to display an image in front of his/her eyes, the user can see an image three-dimensionally with a field of view according to a direction of the face of the user, so that the user can feel as if he/she entered an image world. Creating such content as an electronic game, VR (Virtual Reality), or AR (Augmented Reality) with a view to be displayed on a head-mounted display enables a viewer to enjoy an image experience with a more realistic sense.

SUMMARY

Technical Problems

The head-mounted display can be used for viewing not only the above-described kinds of content, but also various other kinds of content such as a still image, a movie, a television program, or a homemade video image. However, if a user views such content that is not supposed to be viewed on the head-mounted display, mismatch may occur in some cases; for example, the original impression of the content is changed, or visually induced motion sickness may be caused.

The present invention has been made in view of such problems, and it is an object of the present invention to provide a technique capable of causing various pieces of content to be favorably viewed through a head-mounted display.

Solution to Problems

A mode of the present invention relates to a head-mounted display. This head-mounted display includes a frame rate information acquisition unit configured to acquire information relating to a frame rate given to data of a moving image to be displayed, a luminance adjustment unit configured to determine a parameter that determines display luminance according to the frame rate, and a display unit configured to display the moving image at display luminance based on the parameter.

Another mode of the present invention relates to an image displaying method. This image displaying method includes a step of acquiring information relating to a frame rate given to data of a moving image to be displayed, a step of determining a parameter that determines display luminance according to the frame rate, and a step of displaying the moving image at display luminance based on the parameter.

It is to be noted that any combinations of the constituent elements described above and the representations of the present invention obtained by conversion thereof between a method, an apparatus, and so forth are also effective as modes of the present invention.

Advantageous Effect of Invention

According to the present invention, a head-mounted display makes it possible to cause various pieces of content to be viewed favorably.

DESCRIPTION OF EMBODIMENT

Figure 1:
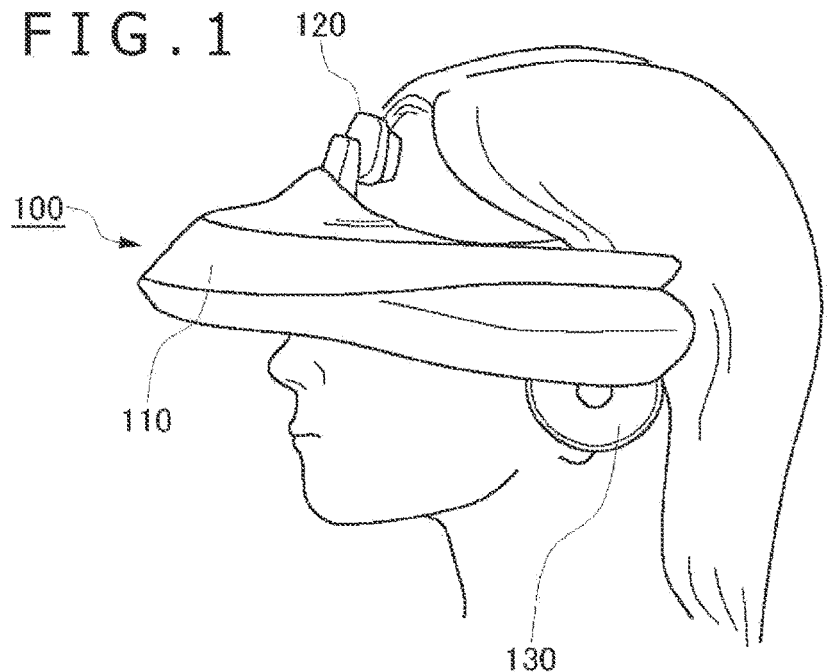
FIG. 1 is a view illustrating an external appearance of a head-mounted display according to an embodiment.

FIG. 1 is a view illustrating an external appearance of a head-mounted display according to an embodiment. A head-mounted display 100 includes a main body portion 110, a front region contact portion 120, and a temporal region contact portion 130. The head-mounted display 100 is a display device mounted on the head of a user to view a still image, a moving image, or the like to be displayed on a display and to listen to sound, music, or the like output from headphones. The main body portion 110 has a shape to cover the eyes of the user in a state in which the head-mounted display 100 is worn by the user, and includes, inside the main body portion 110, a display panel provided in front of the eyes.

An eyepiece lens may be provided between the display panel and the eyes of the user, the eyepiece lens allowing the user to view a displayed image in a magnified manner with a wider field of view. The head-mounted display 100 may further incorporate therein a motion sensor that measures such posture information as a rotation angle and an inclination of the head of the user wearing the head-mounted display 100. Accordingly, it is possible to display an image with a field of view according to movement of the head of the user and to provide the user with a sense of immersion as if the user were immersed into the displayed world.

Figure 2:
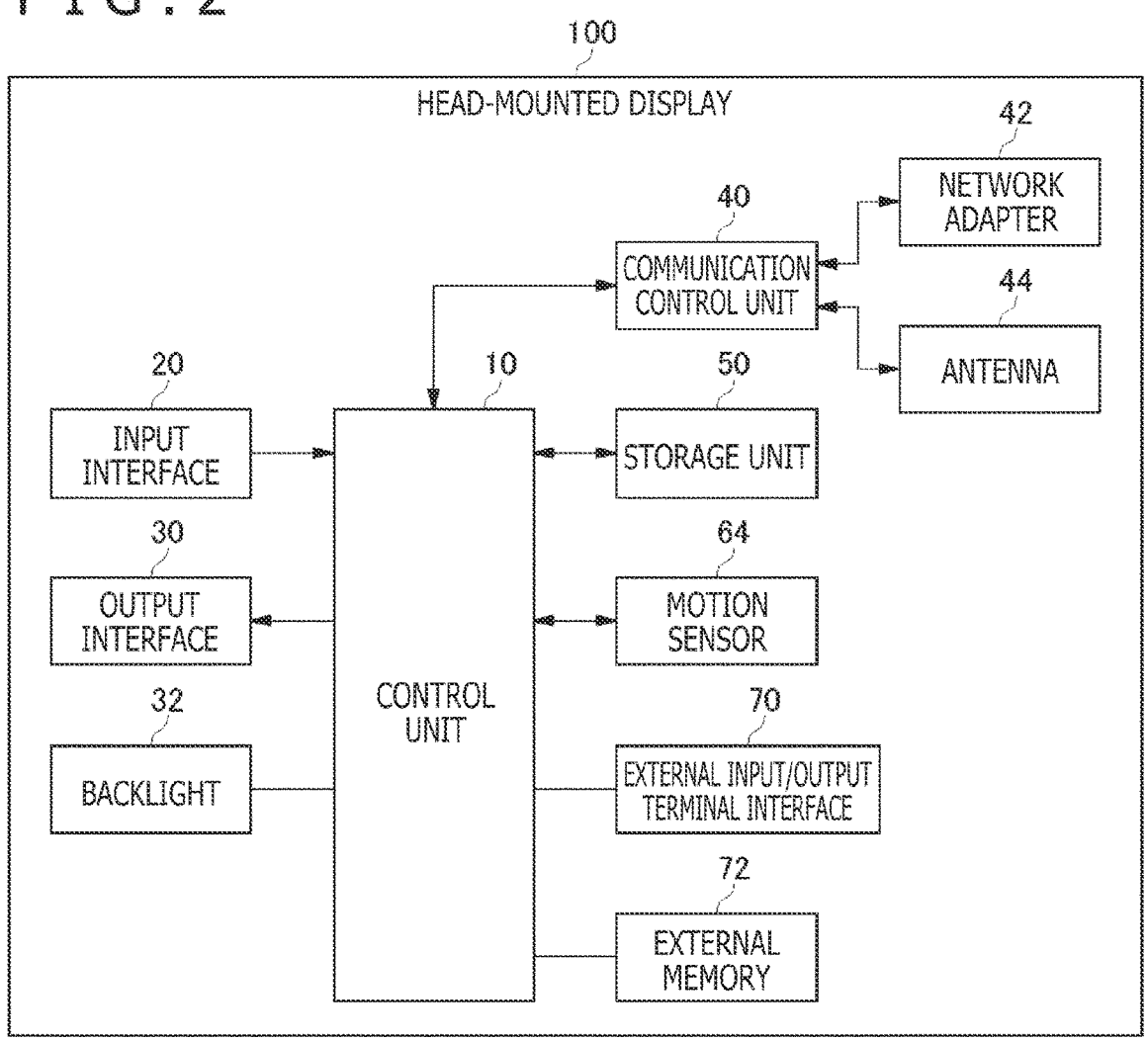
FIG. 2 is a block diagram depicting a circuit configuration of the head-mounted display according to the embodiment.

FIG. 2 depicts a circuit configuration of the head-mounted display 100. A control unit 10 is a main processor that processes such a signal as a sensor signal or an image signal, an instruction, and data to output it. An input interface 20 receives an operation signal and a setting signal from the user and supplies these signals to the control unit 10. An output interface 30 receives the image signal from the control unit 10 to cause a display to display the image signal thereon. A backlight 32 supplies backlight to a liquid crystal display. However, it is possible to eliminate the backlight 32 depending on a structure of a display such as an organic EL (Electro-Luminescence) display.

A communication control unit 40 transmits data input from the control unit 10 to the outside, through a network adapter 42 or an antenna 44, in wired or wireless communication. The communication control unit 40 also receives data from the outside through the network adapter 42 or the antenna 44, in wired or wireless communication, to output the data to the control unit 10. A storage unit 50 temporarily stores data, a parameter, an operation signal, and the like that are processed by the control unit 10.

A motion sensor 64 detects such posture information as a rotation angle or inclination of the main body portion 110 of the head-mounted display 100. The motion sensor 64 is realized by combining a gyro sensor, an acceleration sensor, an angular acceleration sensor, and the like as appropriate. An external input/output terminal interface 70 is an interface for connecting a peripheral device such as a USB (Universal Serial Bus) controller. An external memory 72 is an external memory such as a flash memory.

Figure 3:
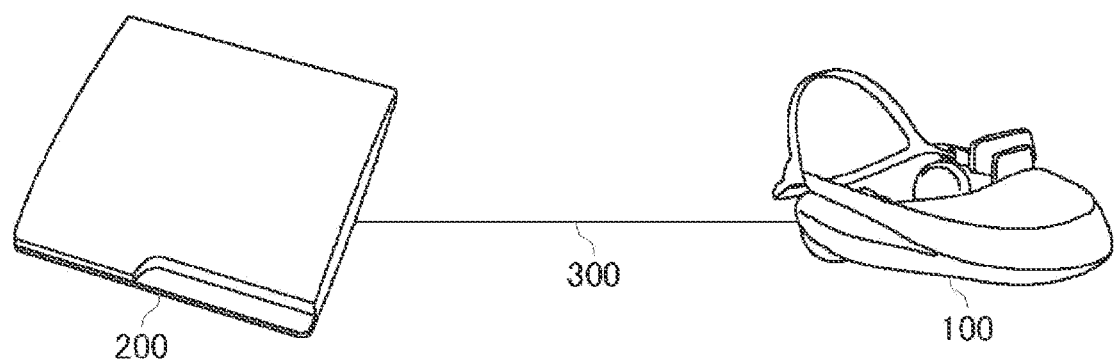
FIG. 3 is a diagram illustrating a configuration of a content processing system according to the embodiment.

FIG. 3 illustrates a configuration of content processing system according to the present embodiment. The head-mounted display 100 is connected to a content processing device 200 by wireless communication or through an interface 300 that connects a peripheral device such as a USB. The content processing device 200 may further be connected to an unillustrated server through a network. Alternatively, instead of the content processing device 200, the server may be connected to the head-mounted display 100. The content processing device 200 may be any one of a gaming device, a personal computer, a portable terminal, or the like. Further, the content processing device 200 and the head-mounted display 100 may be configured integrally.

Content to be processed and displayed by the content processing device 200 or the head-mounted display 100 covers a wide variety of kinds such as a still image, a movie, a homemade video image, a television program, an electronic game, VR, and AR. Here, a frame rate originally given to a moving image differs depending on content. For example, in general, a movie is created or recorded at 24 fps (frames per second), a television program at 30 fps (progressive) or at 60 fps (interlaced), an electronic game at 60 fps, and VR at 60 to 120 fps.

In this manner, in general, even if the original frame rate is different depending on content, the frame rate can be internally adjusted such that the image is displayed at a frame rate as high as possible in order to make maximum use of performance of a display device. This internal adjustment depends on human visual perception that causes an image to be visually recognized with higher precision, in association with a higher frame rate in display. Meanwhile, the present inventor focuses on the facts that human photoreceptor cells include cone cells and rod cells which are different from each other in temporal resolution and the active regions of the cone cells and the rod cells are different from each other depending on luminance of a light stimulus.

Figure 4:
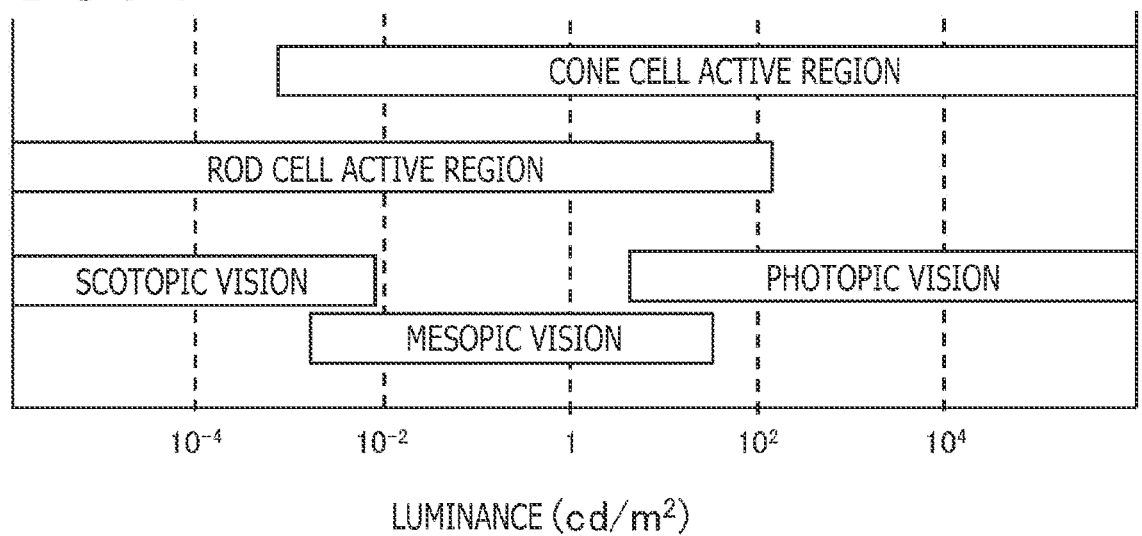
FIG. 4 is a graph indicating a relation between a luminance range of a light stimulus and active regions of photoreceptor cells.

FIG. 4 is a graph indicating a relation between a luminance range of a light stimulus and active regions of photoreceptor cells (for example, "Chapter 16: Human eye sensitivity and photometric quantities," [online], [searched on Jan. 31, 2019], internet <see URL: https://www.ecse.rpi.edu/~schubert/Light-Emitting-Diodes-dot-org/Sample-Chapter.pdf>). As illustrated, with a light stimulus having substantially equal to or less than $10^{-2}$ (cd/m$^2$), only the rod cells are active, while, with a light stimulus having substantially equal to or more than $10^2$ (cd/m$^2$), only the cone cells are active. In an intermediate luminance range between these ranges, both the rod cells and the cone cells are active.

In general, a visual sense when only the rod cells are mainly active is called scotopic vision, a visual sense when only the cone cells are mainly active is called photopic vision, and a visual sense when both cells are active is called mesopic vision. In addition, it has been clarified that the cone cells have higher temporal resolution but lower sensitivity relative to a light stimulus, as compared to the rod cells (see Shuji TACHIBANAKI and Satoru KAWAMURA, "Molecular Bases of the Difference between Rod- and Cone-mediated Vision," Comparative Physiology and Biochemistry, 2017, vol. 34, No. 3, pp. 70 to 79). As described above, causing a viewer to visually recognize, with high temporal resolution of the cone cells, an image displayed with a frame rate as high as possible makes it possible to make the viewer feel that the image is a higher definition image.

In other words, as long as a frame rate in display is set as high as possible, no matter in which range luminance of a light stimulus is, smooth movement and definition of an object are secured. This is particularly important upon viewing content on a flat display such as a common monitor, a common television receiver, or a common portable terminal in which a luminance range of a light stimulus can be significantly changed due to external light such as an extent of illumination inside a room. In contrast, in the case of the head-mounted display illustrated in FIG. 1 that blocks external light, a light stimulus is given only by light emission of the display panel.

The present embodiment uses this to explicitly adjust display luminance depending on content. Specifically, adjusting a luminance range of a light stimulus controls temporal resolution of a visual sense. For example, in the case of such content as a movie, which is produced with a low frame rate, display luminance is set to be low, achieving a state of mesopic vision. Accordingly, the temporal resolution of the visual sense lowers, so that, even if the content is viewed with a low frame rate originally given, the content does not provide such a sense of incongruity that a movement of an object in the content is not smoothly viewed, and mood and a world view of a video image can be reproduced as intended by a producer. Especially in the case of a movie, it is possible to create a state as if the movie were viewed in a movie theater.

Figure 5:
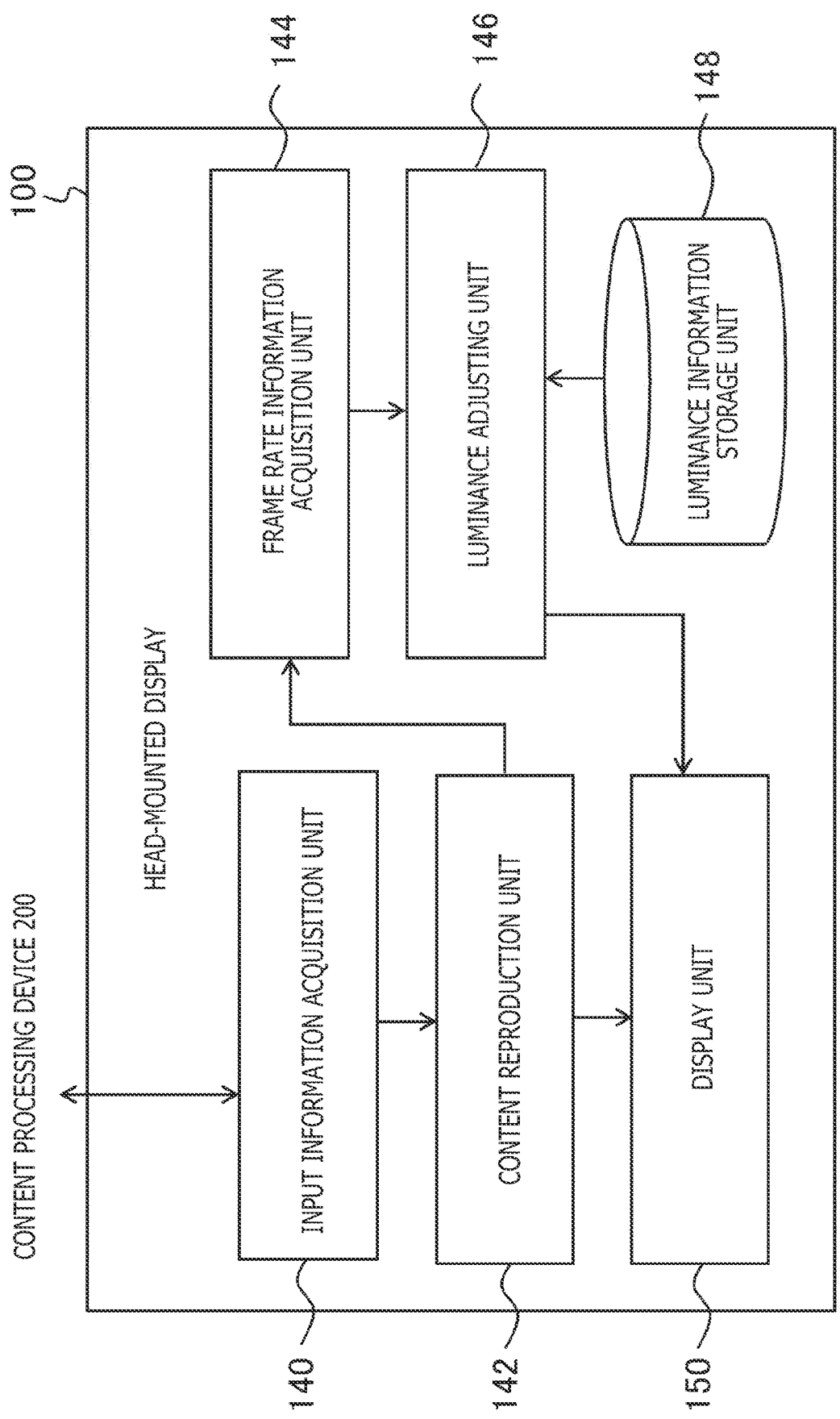
FIG. 5 is a block diagram depicting functional blocks of the head-mounted display according to the embodiment.

FIG. 5 is a block diagram depicting functional blocks of the head-mounted display 100 according to the embodiment. Note that at least some of the functions illustrated in FIG. 5 may be implemented in the content processing device 200. Alternatively, at least some of the functions illustrated may be implemented in a server connected to the head-mounted display 100 or the content processing device 200 through a network.

FIG. 5 depicts a block diagram mainly focusing on a function of displaying an image of content, among functions included in the head-mounted display 100. These functional blocks are realized, as hardware, by a configuration including the control unit 10, the storage unit 50, the output interface 30, the backlight 32, and the like which are depicted in FIG. 2, or realized, as software, by a program that is loaded into the storage unit 50 from a recording medium to perform various functions such as a data inputting function, a data retaining function, an image processing function, and a display controlling function. Hence, it is to be understood by those skilled in the art that these functional blocks can be realized in various ways by hardware alone, software alone, or by a combination thereof and that these functional blocks are not limited to any one of them.

The head-mounted display 100 includes an input information acquisition unit 140 that acquires input information required for content reproduction, a content reproduction unit 142 that carries out a reproduction process of content, a frame rate information acquisition unit 144 that acquires information relating to a frame rate of content, a luminance adjustment unit 146 that determines a luminance range in display according to a frame rate of content, a luminance information storage unit 148 that stores setting information associated with a frame rate and luminance at a time of display, and a display unit 150 that displays an image of content in a determined luminance range.

The input information acquisition unit 140 is realized by the input interface 20, the control unit 10, and the like in FIG. 2 and acquires input information input by a user, such as selection of content to be reproduced or an operation on content being reproduced. With use of the motion sensor 64, an operation by movement of the head of the user wearing the head-mounted display 100 may be applicable. Note that it may be applicable to transmit information indicating such operation details of the user described above to the content processing device 200 once and then acquire data of an image generated according to the information from the content processing device 200.

The content reproduction unit 142 is realized by the control unit 10, the storage unit 50, and the like in FIG. 2, and reproduces image data of content. For example, data that has been acquired in advance as content data such as a picture or a movie is subjected to decoding/decompression according to a selection operation by the user and is then set as data for display. In this case, the content reproduction unit 142 includes a storage unit that stores content data which has been subjected to compression/encoding. Alternatively, the content reproduction unit 142 may sequentially reproduce data that is transferred from a server not illustrated or the content processing device 200.

A transmission path of image data to be displayed on the head-mounted display 100 or conversion of data may adopt any one of common techniques. The frame rate information acquisition unit 144 is realized by the control unit 10, the storage unit 50, and the like in FIG. 2, and acquires information relating to a frame rate of content. For example, when a frame rate is included in metadata that is appended to content data, the frame rate information acquisition unit 144 reads out the metadata. Alternatively, in a case in which a standard frame rate is determined according to a category of content such as a movie, the frame rate information acquisition unit 144 acquires the category of the content from bibliographic information to identify the frame rate of the content. In this case, the frame rate information acquisition unit 144 retains therein data in which a category of content and a frame rate are associated.

The luminance adjustment unit 146 is realized by the control unit 10, the storage unit 50, and the like in FIG. 2, and determines display luminance or a luminance range in such a manner that the display luminance or the luminance range corresponds to a frame rate of content. In view of the fact that the smaller a light stimulus is, the more active the cone sells having low temporal resolution become, as described above, from a qualitative point of view, the lower a frame rate of content is, the more reduced luminance is. The luminance information storage unit 148 is realized by the storage unit 50 in FIG. 2, and stores setting information in which a frame rate of content and display luminance or a luminance range are associated.

The display unit 150 is realized by the control unit 10, the output interface 30, the backlight 32, and the like in FIG. 2, and converts image data which is reproduced by the content reproduction unit 142 into an electric signal, to display an image by driving elements in the display panel. Here, a frame rate in display is set as a frame rate originally given to an image of content, and frame interpolation between frames, or the like may not be carried out. However, the frame rate in display is not necessarily required to be set to be the same as the frame rate of the content and may be increased by interpolating a frame depending on a case. Also in this case, visual temporal resolution, by further extension, a frame rate in recognition, can be controlled by adjustment of display luminance, whereby a similar effect can be obtained.

In addition, the display unit 150 follows the determination by the luminance adjustment unit 146 and adjusts luminance of the backlight. In the case of a display with no backlight, when luminance represented by a pixel value in the original image is converted into display luminance or when the luminance is converted into voltage, for example, the display unit 150 carries out an adjustment that follows the determination by the luminance adjustment unit 146. In general, the luminance represented as the pixel value in the original image is converted according to human visual perception, a luminance characteristic of a display device, or the like, and is eventually converted into voltage. For example, in a case in which an image represented by 16 bits in each color is to be displayed on an 8-bit display device, grayscale compression by tone mapping according to human visual perception is carried out.

Figures 6, 7:
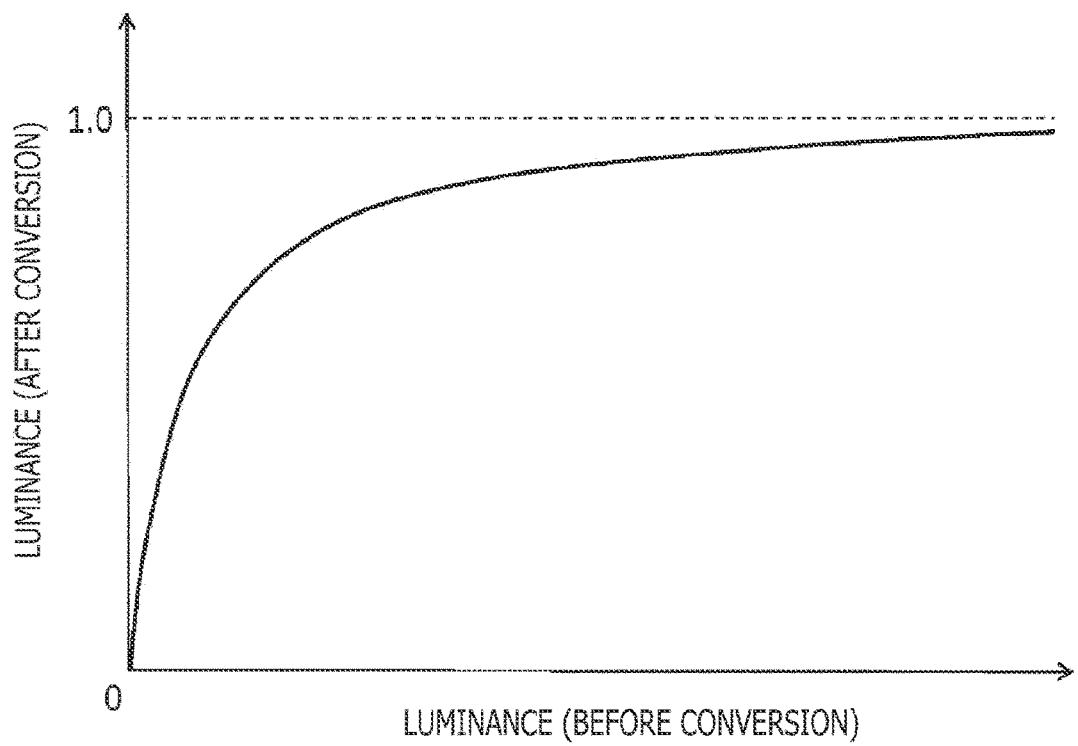
FIG. 6 is a diagram illustrating a tone curve used for tone mapping.
FIG. 7 is a table illustrating a data structure of luminance information stored in a luminance information storage unit according to the embodiment.

FIG. 6 is a diagram illustrating a conversion function used for tone mapping, that is, a tone curve. FIG. 6 indicates a Reinhard function which is a typical tone curve, and by reducing a gray scale range as luminance goes from a low luminance region to a high luminance side, the gray scale can be compressed without largely changing impression of appearance of the image. In FIG. 6, a luminance range after conversion is normalized to a value from 0 to 1.0. For example, the display unit 150 sets a real value of luminance associated with 1.0 to be lower as a frame rate of content is lower, thereby converting the luminance.

Accordingly, it is possible to reduce the whole luminance range while minimizing an effect on color balance. Alternatively, the display unit 150 carries out gamma correction by increasing a gamma value more as the frame rate is lower, whereby an average luminance may be set to be small. Further, any one of techniques of adjusting luminance of a display image, such as adjusting an amplitude of current flowing through a display or moderating a pulse width of an applied voltage, may be adopted.

FIG. 7 illustrates a data structure of luminance information stored in the luminance information storage unit 148. In this example, a luminance information table 160 includes a frame rate field 162 and a display luminance field 164. In the frame rate field 162, each range of a frame rate of content is entered, while, in the display luminance field 164, each setting relating to luminance at a time when content in each range of the frame rate is to be displayed is entered. In the display luminance field 164 indicated, an upper limit of luminance at a time of displaying with a maximum value of luminance which can be output set to 100% is expressed in percentage.

Specifically, content having a frame rate of 31 to 240 fps is displayed at the luminance of 100%, whereas content having a frame rate of 1 to 30 fps is displayed at the luminance of 50% at maximum. The luminance adjustment unit 146 refers to the luminance information table 160 and acquires a display luminance ratio corresponding to content to be reproduced. Then, the display unit 150 adjusts the luminance of the backlight 32 at a ratio corresponding to the display luminance ratio or adjusts a function at a time of luminance conversion, to thereby control a luminance range at a time of display.

However, the luminance information table illustrated is merely one example, and a parameter to be set is not limited as long as a luminance range can be adjusted. For example, as the display luminance field 164, a tone curve or a gamma value may be associated with display luminance. Alternatively, the range of the frame rate may be three or more. Moreover, a function to determine the display luminance may be expressed by a mathematical equation having the frame rate as a variable.

Further, depending on displayed details of each content, the display luminance may strictly be adjusted. Specifically, in a technique of controlling an upper limit of the display luminance, in a case in which the entire content is a dark video image, it may be considered that the luminance of the content is controlled to be low beyond necessity. Accordingly, a maximum value or an average value of actual luminance represented in each piece of content may be controlled so as to correspond to a frame rate. For a similar reason, setting of luminance, a tone curve, a gamma value, or the like of the backlight 32 may be made different depending on a scene of content.

Figure 8:
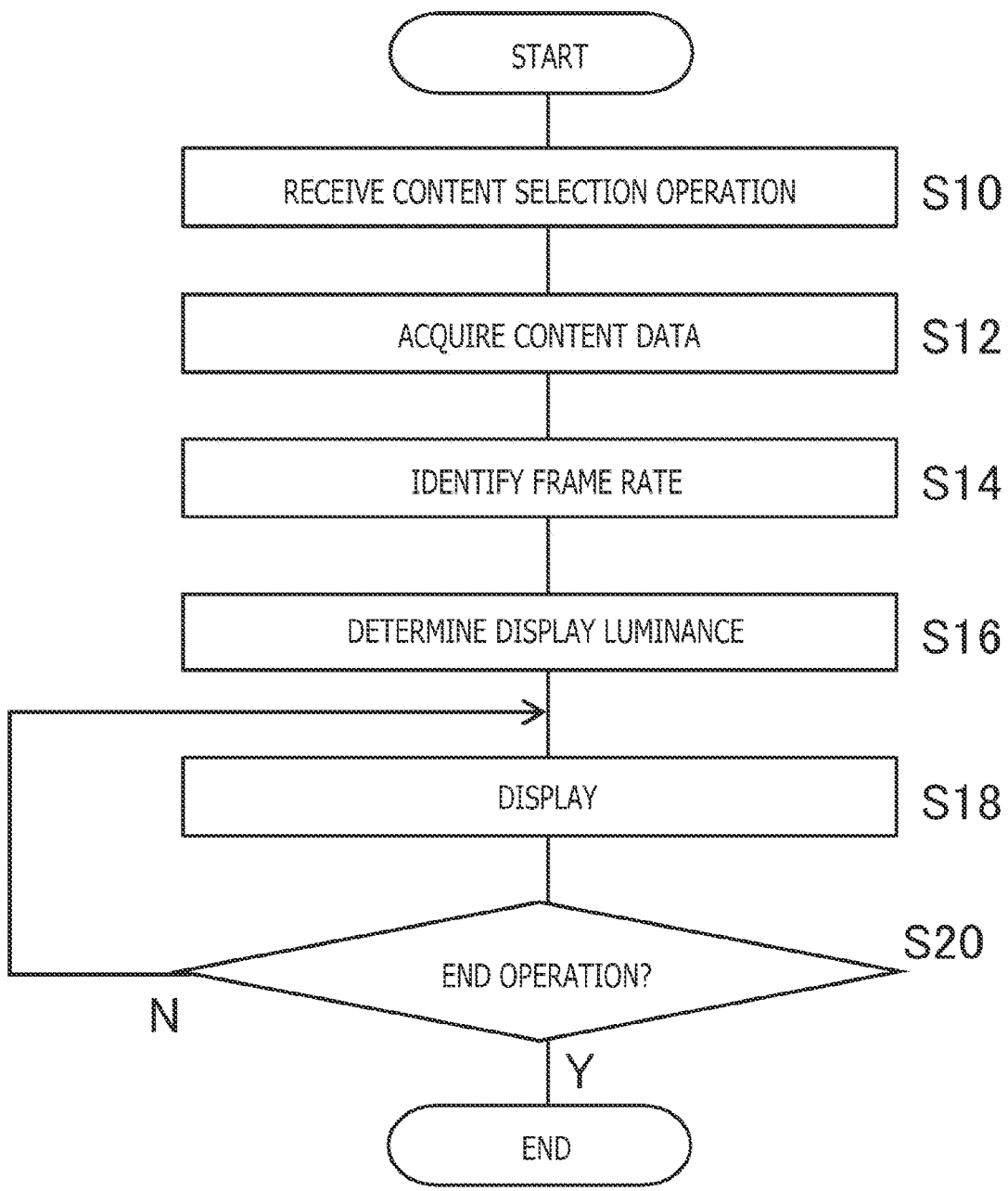
FIG. 8 is a flow chart indicating a process in which the head-mounted display according to the embodiment displays an image with luminance corresponding to a frame rate.

Next, an operation of a head-mounted display realized by the above-described configuration will be described. FIG. 8 is a flow chart indicating a process in which the head-mounted display 100 displays an image with luminance corresponding to a frame rate. First, the input information acquisition unit 140 receives a selection operation of content to be processed, from a user (S10). This process may be realized, for example, with use of means by which a user wearing the head-mounted display 100 moves a cursor being displayed together with a list of content by movement of his/her head, or the like.

Next, the content reproduction unit 142 acquires data of the selected content by reading out the data from the storage unit, for example (S12). As described above, however, the data of content or data of a display image may be acquired from the content processing device 200, a server not illustrated, or the like. In this case, pieces of information relating to a selection operation of content and an input operation on the content are transmitted from the head-mounted display 100 to these devices.

Next, the frame rate information acquisition unit 144 identifies a frame rate by reading out metadata that is appended to the data of content (S14). Then, the luminance adjustment unit 146 refers to the luminance information storage unit 148 on the basis of the identified frame rate, and determines display luminance or a range thereof (S16). As described above, however, by determining a tone curve, a gamma value, or the like, a range of luminance may indirectly be determined. An image of content reproduced by the content reproduction unit 142 is adjusted by use of the backlight 32 or a luminance conversion function, and accordingly, the display unit 150 displays the determined range of luminance (S18).

Unless an operation for terminating the display is carried out by the user or the content itself is ended, the display is continued (N in S20, and S18). If there is a need to terminate the display, the entire process is ended (Y in S20). In this manner, adjusting luminance according to a frame rate makes it possible to express an original world of an image without any sense of incongruity, even if content having a low frame rate is displayed as it is. In addition, adjusting luminance according to a frame rate also provides an advantageous effect of preventing an excessive light stimulus which could be generated by displaying an image originally supposed to be viewed at a distant place in a dark room, such as a movie, in front of the eyes and cause visually induced motion sickness or eyestrain.

Figure 9:
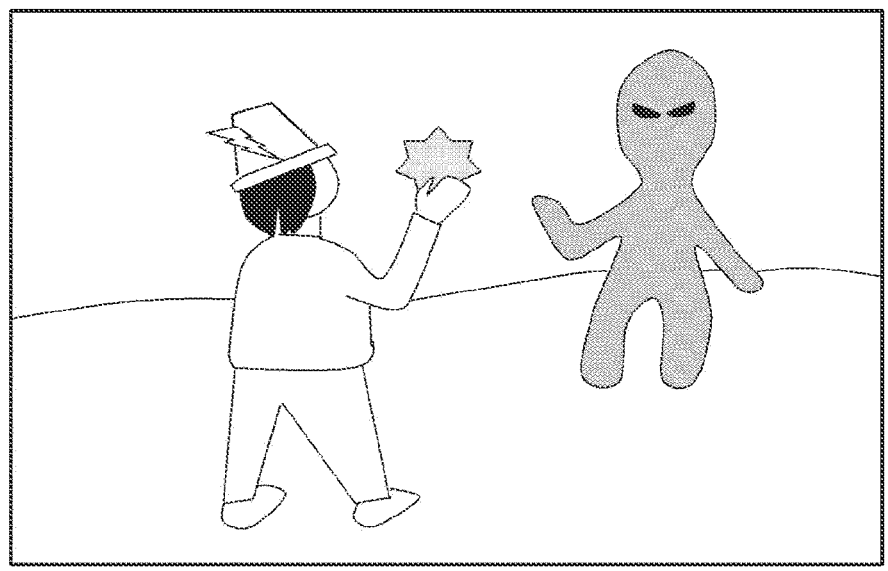
FIG. 9 depicts views schematically illustrating a manner in which an area of a display region is adjusted together with display luminance, according to a frame rate of content in the embodiment.
Figure 9:
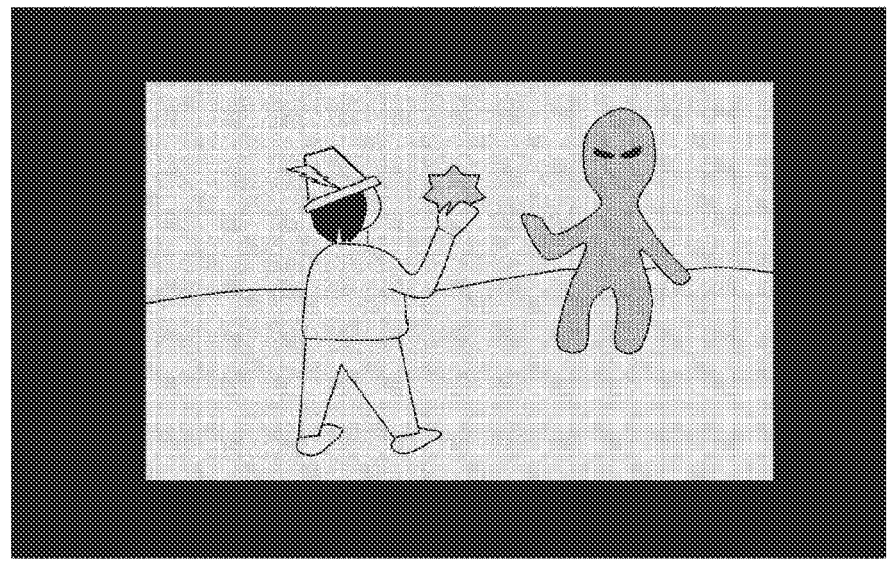

Here, in order to further reduce visually induced motion sickness or eyestrain, an area of a display region of an image may be changed according to a frame rate. FIG. 9 depicts views schematically illustrating a manner in which an area of a display region is adjusted together with display luminance, according to a frame rate of content. Subfigures (a) and (b) each depict an image to be visually recognized by a viewer. In practice, however, displaying an image for the right eye and an image for the left eye in right and left regions of the display panel, respectively, may achieve stereoscopic vision. Subfigure (a) is an image which is created for an electronic game or a VR experience and has a frame rate equal to or more than 60 fps, for example.

In contrast, Subfigure (b) is a movie having a frame rate of 24 fps, for example. As has been described so far, the image in Subfigure (b) has display luminance set lower than the image in Subfigure (a) and is put into a mesopic vision state, for example. Moreover, in Subfigure (b), a display region of the image on the display panel of the head-mounted display 100 is set narrower than that of the image in Subfigure (a). Accordingly, an excessive light stimulus can be prevented, and moreover, a range in which an object appearing in the image moves in units of time is restricted, so that movement of the eyeballs which follow the object becomes slow, resulting in reduction of visually induced motion sickness or eyestrain.

In this manner, in a case in which a display region is adjusted, a field indicating an area ratio of the display region with respect to an area of the display panel is further associated with the luminance information table 160 depicted in FIG. 7. Alternatively, as with the case of the luminance, the area ratio of the display region may be expressed with a mathematical equation having a frame rate as a variable, or the like. Note that, in some cases, even if the area of the display region alone is adjusted without adjusting display luminance, an effect of reducing visually induced motion sickness or eyestrain can be obtained.

According to the present embodiment described above, in the head-mounted display, an image is displayed at a frame rate originally given to content, and in addition, display luminance is adjusted according to the frame rate. For example, content such as a movie that is originally produced on the premise of being viewed at a lower frame rate is displayed such that luminance of the content is set lower than luminance of an electronic game or the like which is produced at a higher frame rate.

This reduces temporal resolution of a visual sense, making it possible to achieve an image expression in which an original world view of content is maintained on the head-mounted display without any sense of incongruity even at a low frame rate. Moreover, since a process of interpolating a frame according to performance of the head-mounted display can be omitted, a processing load or power consumption can be reduced. Further, an excessive light stimulus can be prevented, thereby producing an advantageous effect also on reduction of visually induced motion sickness or eyestrain. Adjustment of the area of the display region makes this effect more remarkable. According to these configurations, it is possible to realize display using a characteristic that content originally has in an approach different from that for such content for which realistic sensation is required as content originally being produced with the intention of being displayed on the head-mounted display in the first place.

The present invention has been described based on the embodiment. It is to be understood by those skilled in the art that the embodiment described above is illustrative, that combinations of components and processes thereof can be modified in various ways, and that these modification examples also fall within the scope of the present invention.

REFERENCE SIGNS LIST

10: Control unit
20: Input interface
30: Output interface
32: Backlight
50: Storage unit
100: Head-mounted display
140: Input information acquisition unit
142: Content reproduction unit
144: Frame rate information acquisition unit
146: Luminance adjustment unit
148: Luminance information storage unit
150: Display unit
200: Content processing device

INDUSTRIAL APPLICABILITY

As described above, the present invention is applicable to a head-mounted display, a content processing system including a head-mounted display, and the like.

The invention claimed is:

1. A head-mounted display comprising:
circuitry configured to:
acquire information relating to a frame rate given to data of a moving image to be displayed;
determine a parameter that determines display luminance according to the frame rate,
control the parameter based on the frame rate such that the display luminance has a direct relationship with the frame rate;
adjust an area of a display region on a display panel according to the frame rate; and
a display configured to display the moving image at the display luminance based on the parameter and in the adjusted area of the display region on the display.

2. The head-mounted display according to claim 1, circuitry is configured to
interpolate data of the moving image to be displayed, such that the moving image is displayed at an increased frame rate; and
use the increased frame rate to determine the parameter, wherein the display displays the moving image at the increased frame rate.

3. The head-mounted display according to claim 1, wherein the circuitry is further configured to:
acquire a category of the moving image, and identify a frame rate associated with the category to thereby acquire the frame rate.

4. The head-mounted display according to claim 1, wherein the circuitry is further configured to:
read out metadata that is appended to the data of the moving image, to thereby acquire the frame rate.

5. The head-mounted display according to claim 1, wherein the display adjusts luminance of a backlight of a liquid crystal display on a basis of the parameter.

6. The head-mounted display according to claim 1, wherein the display converts luminance represented by pixels of the moving image, on a basis of the parameter, and then displays the moving image.

7. The head-mounted display according to claim 1, wherein the circuitry is configured to decrease the display region in proportion to a reduction in the frame rate.

8. The head-mounted display according to claim 1, wherein a gray scale range of the moving image is reduced as luminance increases.

9. The head-mounted display according to claim 1, wherein an average luminance of the moving image is decreased in response to a decrease in the frame rate.

10. The head-mounted display according to claim 1, further comprising a main body that blocks external ambient light from the display.

11. An image displaying method by a head-mounted display, comprising:
acquiring information relating to a frame rate given to data of a moving image to be displayed;
determining a parameter that determines display luminance according to the frame rate;
control the parameter based on the frame rate such that the display luminance has a direct relationship with the frame rate;
adjust an area of a display region on a display panel according to the frame rate; and
displaying the moving image at the display luminance based on the parameter and in the adjusted area of the display region on the display panel.

12. The method according to claim 11, further comprising acquiring a category of the moving image and identifying a frame rate associated with the category to thereby acquire the frame rate.

13. The method according to claim 11, further comprising reading out metadata that is appended to the data of the moving image, to thereby acquire the frame rate.

14. The method according to claim 11, further comprising decreasing the display region on the display panel in direct relationship to a reduction in the frame rate.

15. The method according to claim 11, further comprising blocking external light from the display panel.

16. A non-transitory computer-readable medium having stored thereon a computer program for a computer, comprising:
acquiring information relating to a frame rate given to data of a moving image to be displayed;
determining a parameter that determines display luminance according to the frame rate;
controlling the parameter based on the frame rate such that the display luminance has a direct relationship with the frame rate;
adjusting an area of a display region based on the frame rate; and
outputting the parameter to a display to display the moving image at the display luminance based on the parameter and in the adjusted area of the display region on the display.

17. The non-transitory computer-readable medium according to claim 16, wherein the computer program further includes acquiring a category of the moving image and identifying a frame rate associated with the category to thereby acquire the frame rate.

18. The non-transitory computer-readable medium according to claim 16, wherein the computer program further includes reading out metadata that is appended to the data of the moving image, to thereby acquire the frame rate.

19. The non-transitory computer-readable medium according to claim 16, wherein the computer program further includes decreasing the display region on the display in direct relationship to a reduction in the frame rate.

\* \* \* \* \*